United States Patent [19]

McCann

[11] Patent Number: 4,729,011
[45] Date of Patent: Mar. 1, 1988

[54] METHOD AND APPARATUS FOR DIGITIZING TELEVISION SIGNALS

[75] Inventor: Kenneth D. McCann, Reigate, England

[73] Assignee: U.S. Philips Corporation, New York, N.Y.

[21] Appl. No.: 871,181

[22] Filed: Jun. 5, 1986

[30] Foreign Application Priority Data

Jun. 5, 1985 [GB] United Kingdom ............... 8514152

[51] Int. Cl.$^4$ ............................................ H04N 17/02
[52] U.S. Cl. .......................................... 358/10; 358/31; 358/36; 358/37
[58] Field of Search ..................... 358/31, 13, 36, 37, 358/166, 167, 10

[56] References Cited

U.S. PATENT DOCUMENTS

| 4,218,700 | 8/1980 | Kashigi | 358/31 |
| 4,531,149 | 7/1985 | Lewis | 358/31 |
| 4,549,201 | 10/1985 | Tanaka | 358/13 |

Primary Examiner—Michael A. Masinick
Attorney, Agent, or Firm—Thomas A. Briody; William J. Streeter; Gregory P. Gadson

[57] ABSTRACT

An arrangement for digitizing television signals, particularly the staircase portion of the vertical interval test signal transmitted by the British Broadcasting Corporation and the Independent Broadcasting Authority comprises a luminance/chrominance separator (2) and two analog to digital converters (ADC's) (6, 9). The ADC(6) digitizes the color subcarrier which has a low amplitude but a high frequency while the ADC(9) digitizes the high amplitude low frequency luminance portion. The digitized samples are stored in two sections of RAM (11, 13) under the control of a write address generator (25) and two respective write control circuits (14,17). The ADC(6) operates at $4_{fsc}$ and has a resolution of 7 bits while the ADC(9) operates at one sixteenth of that rate and has a resolution of 10 bits. This enables a full 10 bit resolution to be obtained without requiring a high cost ADC.

13 Claims, 5 Drawing Figures

METHOD AND APPARATUS FOR DIGITIZING TELEVISION SIGNALS

BACKGROUND OF THE INVENTION

The invention relates to an arrangement for digitizing television signals, which signals comprise a luminance portion whose amplitude changes at a relatively low frequency and a high frequency color subcarrier portion, said arrangement comprising a first and second analog to digital converter, means for separating the luminance and color subcarrier portions, means for applying the separated luminance portion to the first analog to digital converter, and means for applying the separated subcarrier portion to the second analog to digital converter. The invention further relates to an arrangement for measuring television signals and to a television transmitter.

Broadcasting authorities generally require their transmitters to meet certain requirements concerning the quality of the transmitted signals. Among the more important parameters that have to be monitored or controlled are linearity and differential gain. With the growing use of computers for analyzing signals it becomes desirable to digitize the television signals to make them convenient to handle. In the United Kingdom (UK) both the British Broadcasting Corporation and the Independent Broadcasting Authority insert test signals into certain line of the television signal during the field blanking period. These signals include a portion which includes a luminance portion having a staircase form on each step of which a constant amplitude color subcarrier wave is superimposed. This can be used to measure three important non-linear distortions, i.e. luminance non-linearity, differential gain, and differential phase. If this signal is converted directly to a digital representation then in order to satisfy the Nyquist Criterion it must be sampled at a rate greater than twice the video signal bandwidth, i.e. faster than 11 MHz in the UK. In practice the analysis is easier to carry out if the sampling rate is four times the color subcarrier frequency ($\approx$ 17.7 MHz). The digitization must also be very accurate since any error in the conversion process will cause a much larger error in the calculated values of luminance non-linearity and differential gain. If these parameters need to be measured to within about 1% then a 10 bit analog to digital converter is required. The combination of high speed of operation and high accuracy is expensive.

There are a variety of methods which allow the signal to be digitized in a less expensive manner, but all the known methods tend to degrade the speed, accuracy or susceptability to noise of the arrangement. One method, which is used in the Tektronix Automatic Video Measurement Set 1980 Answer, is to use a high speed reduced resolution analog to digital converter and the add a dither signal to the analog video input. The full resolution is eventually obtained by averaging the resultant digital signal over many repeated occurances of the test signal. Another method, which is used in the Thomson-CSF TTV 8400 System, is to use a low speed full resolution analog to digital converter and to build up a complete replica of the test signal by taking a few samples from each of successive test signals. This is however a slow process which is susceptable to noise.

SUMMARY OF THE INVENTION

It is an object of the invention to enable the digitization of video signals to be carried out in an alternative manner which mitigates at least some of the disadvantages referred to hereinbefore.

The invention provides an arrangement for digitizing television signals as set forth in the opening paragraph characterized in that the color subcarrier signal has a relatively low peak value compared with that of the total television signal and the second analog to digital converter has a lower resolution and a higher speed of operation than the first analog to digital converter.

The invention is based on the recognition of the fact that the most important parameters which have to be monitored can be determined by analysis of the staircase portion of the test signal and that by separating the two components of the staircase and separately digitizing them it is possible to maintain the full speed and accuracy without the use of an analog to digital converter having both a high speed of operation and high resolution.

The second analog to digital converter may operate at an integral multiple of the color sub-carrier frequency, which multiple may be four.

By sampling at four times the color sub-carrier frequency ($\approx$ 17.7 MHz for the PAL System I signal) the subsequent signal processing can be simplified.

The operating frequency of the first analog to digital converter may be $\frac{1}{2}^n$ of that of the second analog to digital converter, where n is a positive integer greater than one and may be four.

This enables a simple binary divider to be used to generate the clock for the first analog to digital converter from the clock applied to the second analog to digital converter.

The arrangement may further comprise means for writing the outputs of the first and second analog to digital converters into a store.

An arrangement in which the television signal comprises a test signal for transmission on one or more lines of each television field or frame may be characterized in that the arrangement comprises means for selecting the line or lines in which the test signal is transmitted and writing the outputs of the analog to digital converters into the store only on those lines.

The arrangement may further comprise means for writing the outputs of the analog to digital converters into the store only during a selected portion of the lines on which the test signal is transmitted.

The invention further provides an arrangement for measuring the distortion of television signals transmitted by a television transmitter comprising means for receiving the transmitted signal, means for demodulating the transmitted signal, means for digitizing the demodulated signal, means for analyzing the digitized signal, and means for displaying the measured distortion characterized in that the means for digitizing the demodulated signal comrpises an arrangement for digitizing television signals according to the invention.

The invention still further relates to a television transmitter comprising a video signal input; means for modulating a carrier signal by the video signal; non-linear power amplifier means for amplifying the modulated carrier signal; a pre-corrector circuit for applying a correction to the video signal before or after modulation and before it is applied to the power amplifier means; means for measuring the distortion at the output of the power amplifying means; means for generating a control signal representative of the distortion of the output of the power amplifying means; and means for applying the control signal to a control input of the pre-corrector circuit to reduce the distortion at the output of the power amplifying means; wherein the measuring means comprises means for extracting a portion of the transmitted signal, and means for demodulating the portion to produce a demodulated television signal, characterized in that the measuring means further comprises means for digitizing the demodulated television signal, the digitizing means comprising an arrangement for digitizing a television signal according to the invention.

The television transmitter may comprise means for transmitting a test signal in a television line during the field or frame blanking interval, means for selecting the line in which the test signal is transmitted, and means for applying at least a part of the selected line to the measuring means.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
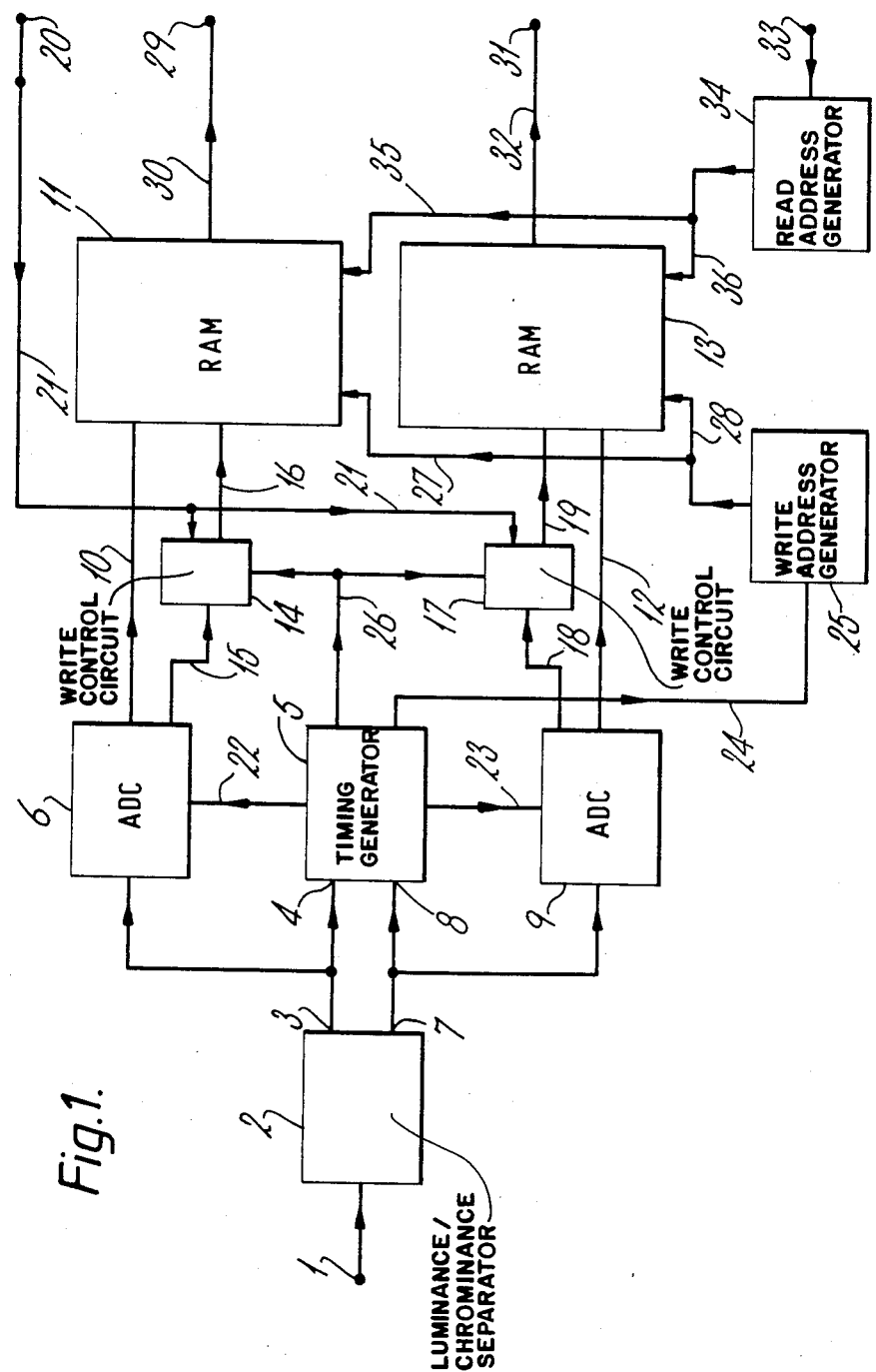
FIG. 1 shows in block schematic form an arrangement for digitizing television signals according to the invention.
Figure 5:
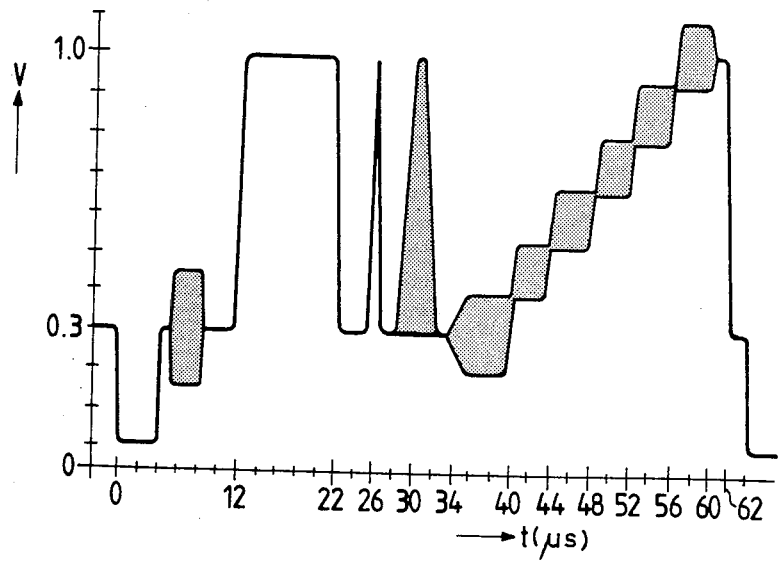
FIG. 5 shows an insertion test signal which the arrangement of FIG. 1 may be used to digitize.

The arrangement for digitizing television signals shown in FIG. 1 has an input 1 for receiving an analog television signal, the input 1 being connected to the input of a luminance/chrominance separator 2. The luminance/chrominance separator 2 may comprise a band pass and a low pass filter to separate a high frequency chrominance portion from a low frequency luminance portion as exists in the staircase portion of the test signal shown in FIG. 5. In FIG. 5 the signal amplitude V between values 0 and 1.0 is plotted versus the time in $\mu$s. The chrominance portion is fed from a first output 3 of the separator 2 to a first input 4 of a timing generator 5 and to the analog signal input of an analog-to-digital converter (ADC) 6. The luminance portion is fed from a second output 7 of the separator 2 to a second input 8 of the timing generator 5 and to the analog signal input of a further analog-to-digital converter (ADC) 9. The digital signal output of the ADC 6 is fed over a path 10 to a block of random access memory (RAM) 11. Similarly the digital signal output of the ADC 9 is fed over a path 12 to a block of RAM 13. A further output of the ADC 6 is connected, over a line 15, to an input of a write control circuit 14 whose output is fed to the RAM 11 over a line 16. Similarly a further output of the ADC 9 is connected to an input of a further write control circuit 17 over a line 18, the output of the further write control circuit 17 being fed to a RAM 13 over a line 19. A terminal 20 is connected via a line 21 to further inputs of the write control circuits 14 and 17. A first output of the timing generator 5 is connected via a line 22 to a further input of the ADC 6, a second output of the timing generator 5 is connected via a line 23 to a further input of the ADC 9, a third output of the timing generator 5 is connected via a line 24 to an input of a write address generator 25, and a fourth output of the timing generator 5 is connected to further inputs of the write control circuits 14 and 17 via a line 26. The output of the write address generator 25 is connected to the RAM 11 via a path 27 and to the RAM 13 via a path 28. An output of the RAM 11 is fed to a terminal 29 via a path 30, while an output of the RAM 13 is fed to a terminal 31 via a path 32. A terminal 33 is connected to an input of a read address generator 34 whose output is connected to the RAM 11 via a path 35 and to the RAM 13 via a path 36.

In operation a television signal is fed to the input 1 and when a test signal of the form shown in FIG. 5 is included in a given line of a field or frame the timing generator 5 produces appropriate signals from the line and field synchronizing pulses to select the line on which the test signal is transmitted. The luminance/chrominance separator 2 separates the low amplitude, high frequency color sub-carrier portion from the high amplitude, low frequency luminance portion of the signal. The separated color sub-carrier portion from output 3 of the separator 2 is fed to the input of the ADC 6 which in this embodiment is a 7 bit ADC which is capable of operating at four times the color sub-carrier frequency ($\approx 17.7$ MHz for the PAL System I signal). The digitized samples are then stored in the RAM 11 under the control of the write address generator 25 and the write control circuit 14. The write control circuit 14 produces a write enable signal on line 16 under the control of a data ready signal produced by the ADC 6 and fed over line 15 and a timing signal generated by the timing generator 5 and fed over line 26. Thus in order to produce the write enable signal for the RAM 11 the timing generator 5 indicates that the appropriate television line and portion of that line is being received and the ADC 6 indicates that the signal has been digitized and that the digital representation of a particular sample is available at the output of the ADC 6. The timing generator 5 also produces a $4f_{sc}$ clock on line 24 which causes the write address generator to increment at that rate so that successive samples available at the output of the ADC 6 are stored at successive locations of the RAM 11.

The luminance portion of the television signal which is produced at the output 7 of the separator 2 is fed to the input of the ADC 9 which is this embodiment is a 10 bit ADC capable of operating at about 1 MHz (conveniently 17.7/16 MHz). The digitized luminance samples are stored in the RAM 13 under the control of the write control circuit 17 and write address generator 25. The write control circuit 17 produces a write enable signal for the RAM 13 on line 19 from similar signals to those applied to the write control circuit 14, the difference being that the data ready signal is taken from the ADC 9 over the line 18. The addresses to the RAM 13 may, conveniently, be the same as those applied to the RAM 11 with the four least significant bits deleted. Thus the addresses to the RAM 13 will change at one sixteenth of the rate at which the addresses to the RAM 11 change. The clock signal to the ADC 6 over line 22 will also be at sixteen times the rate of the clock signal to the ADC 9 over line 23.

The read address generator 34 is incremented by signals applied to terminal 33. Information is read from the RAMs 11 and 13 under the control of the read address generator 34. Again the four least significant bits of the output of the read address generator 34 are not applied to the RAM 13 as only one sixteenth of the number of samples are stored in the RAM 13. The ouputs from the RAMS 11 and 13 are fed to outputs 29 and 31 where they are available separately. Alternatively they could be combined in an adding arrangement to produce a digital version of the input signal, the most significant bit of the color sub-carrier signal being a sign bit.

Figure 2:
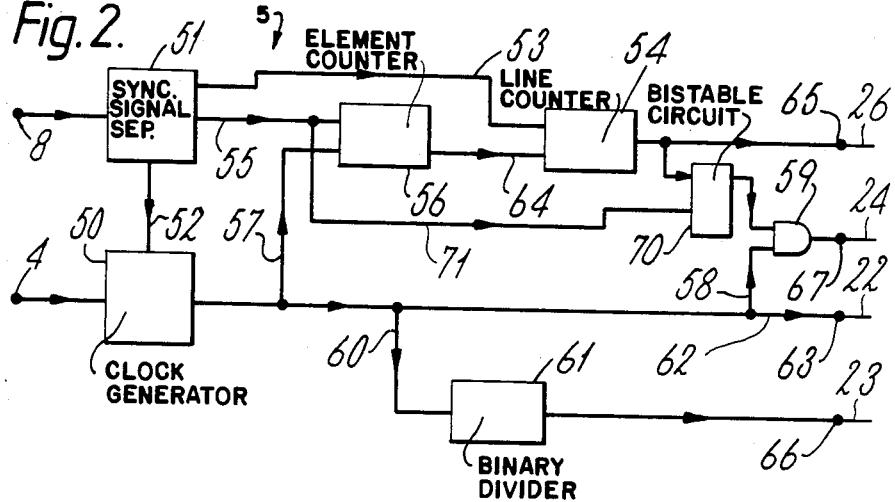
FIG. 2 shows in greater detail the timing generator of FIG. 1.

FIG. 2 shows an embodiment of a timing generator suitable for use as the timing generator 5 of FIG. 1. The input 4 of the timing generator is fed to a clock generator 50 which generates a clock signal at four times the color subcarrier signal ($4_{fsc}$). The input 8 of the timing generator is fed to the input of a synchronizing signal separator 51 which may be of conventional form and which produces a burst gate signal on a line 52 which is fed to a further input of the clock generator 50, field or frame synchronizing pulses on a line 53 which are fed to a line counter 54 and line synchronizing pulses on a line 55 which are fed to an element counter 56. The $4_{fsc}$ output of the clock generator 50 is fed via a line 57 to a further input of the element counter 56, a line 58 to a first input of an AND gate 59, a line 60 to the input of a binary divider 61, and a line 62 to an output terminal 63. The output of the element counter 56 is fed via a line 64 to a further input of the line counter 54. The output of the line counter 54 is fed to the set input of a bistable circuit 70 while the line synchronizing pulses are fed via a line 71 to the reset input of the bistable 70. The Q output of the bistable 70 is fed to a second input of the AND gate 59 so that the AND gate 59 is enabled when the bistable 70 is set. The output of the line counter 54 is also fed to an output terminal 65. The output of the divider 61 is fed to an output terminal 66 while the output of the AND gate 59 is fed to an output terminal 67.

The clock generator 50 comprises an oscillator having a nominal frequency of $4_{fsc}$ which is phase-locked to the input color sub-carrier signal on terminal 4 using the burst gate signal produced by the synchronizing signal separator 51 and applied over line 52. The line counter 54 is preset by the frame or field synchronizing signal on line 53 and is incremented by the line synchronizing signal delayed by the element counter 56 on the line 64. Thus a signal is produced at terminal 65 when a given portion of a given line is reached. This signal is passed over line 26 to the write control circuits 14 and 17 to enable them to produce write enable signals for the RAMs 11 and 13. The element counter 56 is preset by the line synchronizing signals and incremented by the $4_{fsc}$ clock signals. Consequently it produces an output at line frequency which can be delayed by a period which depends on the state to which it is preset and which can be arranged to cause the line counter to increment just prior to the staircase portion of the test signal, i.e. approximately 32 μsecs after the start of the synchronizing pulse. As a result a signal is produced at terminal 65 just prior to the staircase portion of the test signal to allow that portion to be stored in the RAMs 11 and 13. Further the AND gate 59 is enabled and clock pulses at the $4_{fsc}$ rate are produced at terminal 67 and passed via line 24 to the write address generator 25 to cause the write address generator to increment and store the digitized samples at successive locations in RAMs 11 and 13. The $4_{fsc}$ clock signal is present on output terminal 63 and is applied over line 22 to the ADC 6. The $4_{fsc}$ clock signal is divided by sixteen in the divider 61 and the resultant $\tfrac{1}{4}_{fsc}$ clock signal is applied over line 23 to the ADC 9.

Figure 3:
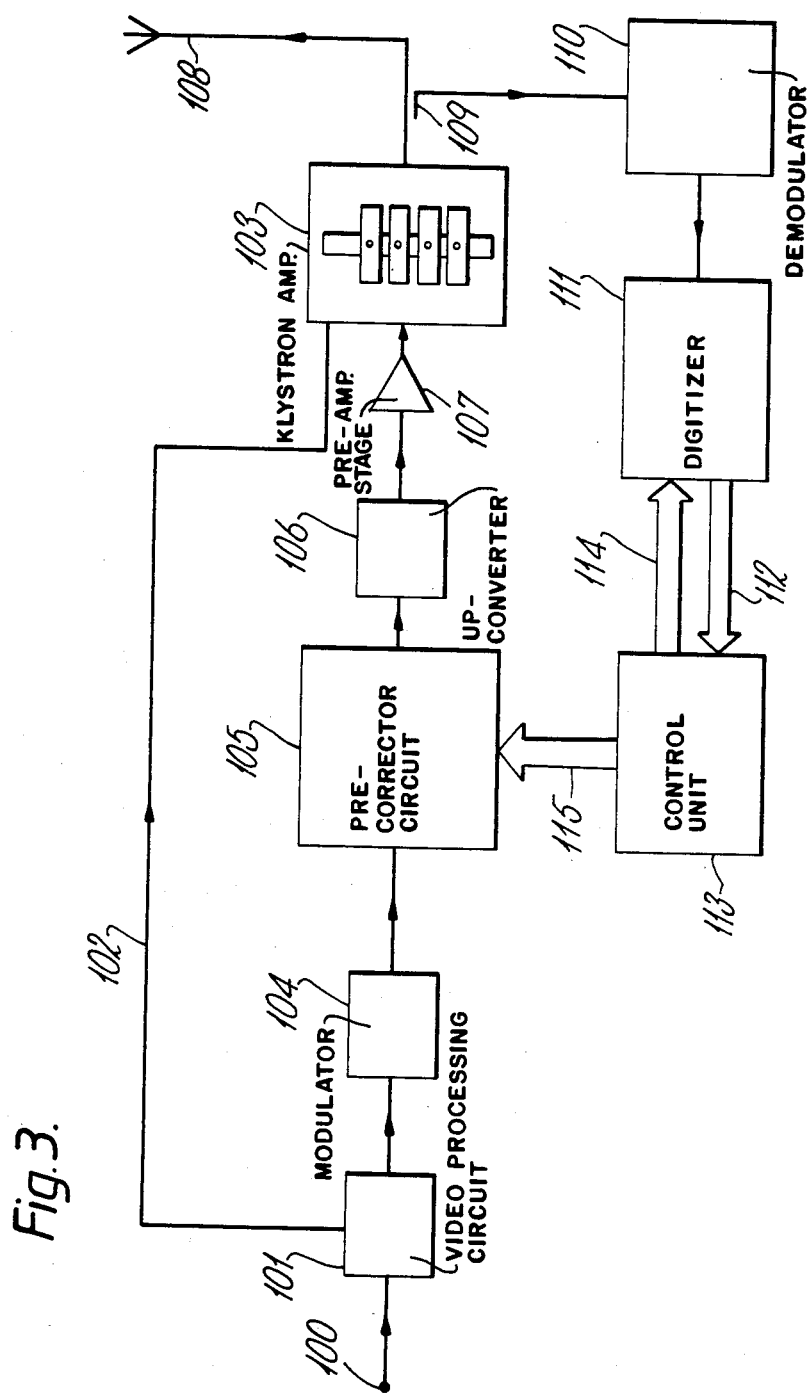
FIG. 3 shows in block schematic form a television transmitter according to the invention.

FIG. 3 shows in block schematic form a television transmitter employing adaptive pre-correction. In order to increase the electrical power efficiency of a transmitter which employs a Klystron amplifier as the power output stage the Klystron is normally driven into a non-linear region of its characteristic as close to saturation as possible. As a result it is necessary to pre-correct the signal applied to the Klystron amplifier to limit the distortion at the output of the amplifier. Conventionally the pre-correctors have a fixed characteristic which is designed to be the inverse of the Klystron characteristic. However, as the degree to which the Klystron is driven into saturation is increased so the demands made on the pre-correction is increased and in order to meet the specifications set by the Broadcasting Authorities, it is necessary to improve the accuracy of the pre-correction.

The transmitter shown in FIG. 3 employs adaptive pre-correction, i.e. the characteristics of the pre-correction circuits are modified in dependence on the distortion measured at the output of the Klystron amplifier. The transmitter has an input 100 to which a composite video signal is applied and which is connected to the input of a video processing circuit 101. The video processing circuit 101 strips the synchronizing pulses from the composite video signal and provides a first output signal comprising the synchronizing pulses which is connected via a line 102 to an anode pulser in a Klystron amplifier 103. The video processing circuit 101 also produces a second output signal comprising the composite video signal minus the synchronizing pulses, the second output signal being fed to a modulator 104. The output of the modulator 104 is fed to the input of a pre-corrector circuit 105 whose output is fed to an up-converter 106. The output of the up-converter 106 is fed via a pre-amplifying state 107 to an input of the Klystron amplifier 103. The output of the Klystron amplifier 103 is fed to a transmitting aerial 108. A probe 109 taps a small portion of the output of the Klystron amplifier 103, the small portion being fed to the input of a demodulator 110 which produces the demodulated composite video signal at its output. The output of the demodulator 110 is fed to a digitizer 111 which in this embodiment comprises an arrangement as shown in FIG. 1. The output of the digitizer 111 is fed via a data bus 112 to a control unit 113 while control signals are fed from the control unit 113 to the digitizer 111 over a data bus 114.

The control unit 113 produces control signals which are fed to the pre-corrector circuit 105 via a bus 115. The control unit 113 will typically comprise a microcomputer including suitable interface circuitry. Such control units are known to workers skilled in the art as evidenced by the measurement systems discussed in the introduction of this specification and as disclosed in UK patent application No. 8423440 (PHB33117) the contents of which are hereby incorporated by reference. The pre-corrector circuit 105 may be substantially as disclosed in that UK patent application.

The Klystron amplifier 103 is operated as near to saturation as possible in order to increase the efficiency and the synchronizing pulses are used to switch the beam current to a higher value during the synchronizing period only. As a result the degree of distortion in the video signal produced by running the Klystron near to saturation is high and significant pre-correction is required to meet the specification. The pre-corrector circuit 105 is made adjustable so that the degree of pre-correction can be controlled to produce the best possible performance. The control unit 113 takes the digitized video signal and analyzes the distortion. It then produces appropriate control signals for application to the pre-corrector circuit 105 to produce a pre-correction characteristic which minimizes the distortion of the output signal.

The control unit 113 provides signals to the digitizer 111 which enable the contents of the RAMs 11 and 13 to be read at a rate at which the control unit is able to absorb and act upon them. This can be independent of the input information rate by appropriate use of the signal applied to the read address generator 34.

Figure 4:
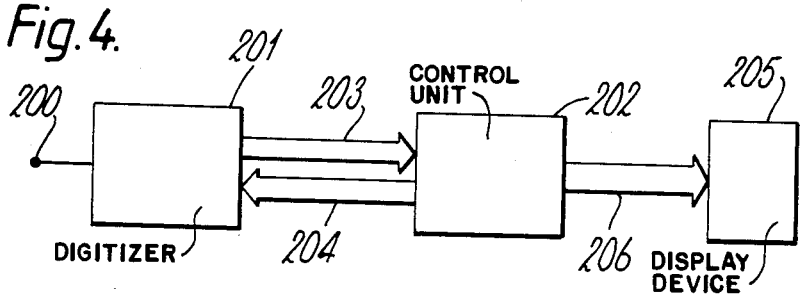
FIG. 4 shows in block schematic form an arrangement for measuring the distortion of television signals according to the invention.

FIG. 4 shows an arrangement for measuring the distortion of a television signal. The arrangement has an input 200 for receiving a composite video signal for analysis. Alternatively the arrangement may additionally include a demodulator for demodulating a television signal produced at the output of a transmitter and, if necessary, a probe for extracting a portion of the signal from the output of the transmitter. The input 200 is connected to a digitizer 201 which may be in the form of an arrangement as shown in FIG. 1. The output of the digitizer 201 is fed to a control unit 202 via a bus 203 while outputs of the control unit 202 are fed via a bus 204 to further inputs of the digitizer 201. Further outputs of the control unit 202 are fed to a display device 205 via a bus 206.

In operation a composite video signal is fed to the input of the digitizer 201 and stored therein. The stored samples are read by the control unit 202 and analyzed and the results of the analysis are fed to the display device 205. The analysis may be carried out in a conventional manner in the control unit 202 which may comprise a microcomputer. The design of such computer based control units is known to those skilled in the art as evidenced by commercially available measuring instruments such as those referred to hereinbefore. The display device may be a video display unit or may be a printer to provide hard copy results. Intermediate storage may be included between the control unit and display device to enable measurements to be made on site and the results to be displayed at a central location.

I claim:

1. A television transmitter comprising a video signal input; means for modulating a carrier signal by the video signal; non-linear power amplifier means for amplifying the modulated carrier signal; a pre-corrector circuit for applying a correction to the video signal before or after modulation and before it is applied to the power amplifier means, means for measuring the distortion in the output of the power amplifying means; means for generating a control signal representative of the distortion of the output of the power amplifying means; and means for applying the control signal to a control input of the pre-corrector circuit to reduce the distortion at the output of the power amplifying means; wherein the measuring means comprises means for extracting a portion of the transmitted signal, and means for demodulating the portion to produce a demodulated television signal, wherein the measuring means further comprises means for digitizing the demodulated television signal, the digitizing means comprising means for separating said luminance and color subcarrier portions, means for applying the separated luminance portion to a first analog-to-digital converter, and means for applying the separated color subcarrier portion to a second analog-to-digital converter having a lower resolution and a higher speed of operation than said first analog-to-digital converter.

2. The television transmitter in claim 1, further comprising means for transmitting a test signal in a television line during the field or frame blanking interval, means for selecting the line in which the test signal is transmitted, and means for applying at least a part of the selected line to the measuring means.

3. A digitizing arrangement for digitizing a television signal, said television signal comprising a luminance portion having low frequency amplitude changes and a high frequency color subcarrier portion having a low peak value compared with that of said television signal, said television signal further comprising a test signal for transmission on at least one line of each television field or frame, said digitizing arrangement comprising:
    means for separating said luminance and color subcarrier portions;
    means for applying the separated luminance portion to a first analog-to-digital converter;
    means for applying the separated color subcarrier portion to a second analog-to-digital converter having a lower resolution and a higher speed of operation than said first analog-to-digital converter;
    means for selecting the lines in which said test signal is transmitted; and
    means for writing the outputs of said first and second analog-to-digital converters into a store only during the selected lines.

4. The digitizing arrangement in claim 3, wherein the means for writing writes the outputs of the analog-to-digital converters into the store only during a selected portion of the lines on which the test signal is transmitted.

5. A measuring arrangement for measuring the distortion of a television signal transmitted by a television transmitter, said television signal comprising a luminance portion having low frequency amplitude changes and a high frequency color subcarrier portion having a low peak value compared with that of said television signal, said measuring arrangement comprising:
    means for receiving a transmitted signal;
    means for digitizing the received signal comprising means for separating said luminance and color subcarrier portions, means for applying the separated luminance portion to a first analog-to-digital converter, and means for applying the separated color subcarrier portion to a second analog-to-digital converter having a lower resolution and a higher speed of operation than said first analog-to-digital converter; and
    means for analyzing the digitized signal to obtain a measure of the distortion of said television signal.

6. The measuring arrangement in claim 5, said means for receiving further comprising means for demodulating the transmitted signal, the transmitted signal being modulated prior to transmission.

7. The measuring arrangement in claim 5 wherein information is read from the store at a rate determined by the analyzing means.

8. The measuring arrangement in claim 5 wherein said television signal further comprises a test signal for transmission on at least one line of each television field or frame, said digitizing arrangement further comprising means for selecting the lines in which said test signal is transmitted, and means for writing the outputs of said first and second analog-to-digital converters into a store only during the selected lines.

9. The measuring arrangement in claim 8, said means for receiving further comprising means for demodulating the transmitted signal, the transmitted signal being modulated prior to transmission.

10. The measuring arrangement in claim 8 wherein information is read from the store at a rate determined by the analyzing means.

11. The measuring arrangement in claim 8 wherein the means for writing of said digitizing arrangement writes the outputs of the analog-to-digital converters into the store only during a selected portion of the lines on which the test signal is transmitted.

12. The measuring arrangement in claim 11, said means for receiving further comprising means for demodulating the transmitted signal, the transmitted signal being modulated prior to transmission.

13. The measuring arrangement in claim 11 wherein information is read from the store at a rate determined by the analyzing means.

* * * * *